(12) United States Patent
McMahon

(10) Patent No.: US 7,106,168 B2
(45) Date of Patent: Sep. 12, 2006

(54) MENU DRIVEN WALL CONSOLE WITH LED INDICATORS FOR GARAGE DOOR OPERATOR

(75) Inventor: Michael T. McMahon, Salem, OH (US)

(73) Assignee: Overhead Door Corporation, Lewisville, TX (US)

( * ) Notice: Subject to any disclaimer, the term of this patent is extended or adjusted under 35 U.S.C. 154(b) by 196 days.

(21) Appl. No.: 10/755,578

(22) Filed: Jan. 12, 2004

(65) Prior Publication Data

US 2005/0151622 A1 Jul. 14, 2005

(51) Int. Cl.
G08B 19/00 (2006.01)
H04Q 9/00 (2006.01)

(52) U.S. Cl. .................. 340/5.61; 340/5.54; 340/5.71; 340/5.31; 340/5.7

(58) Field of Classification Search ............... 340/5.61, 340/5.54, 5.71, 5.31, 5.7
See application file for complete search history.

(56) References Cited

U.S. PATENT DOCUMENTS

| | | | |
|---|---|---|---|
| 4,491,917 A | | 1/1985 | Higgins et al. |
| 4,532,507 A | * | 7/1985 | Edson et al. ............... 340/5.22 |
| 4,634,846 A | * | 1/1987 | Harvey et al. ............. 340/5.23 |
| 4,831,509 A | | 5/1989 | Jones et al. |
| 5,252,960 A | | 10/1993 | Duhame |
| 5,428,923 A | | 7/1995 | Waggamon |
| 5,576,701 A | * | 11/1996 | Heitschel et al. .......... 340/5.31 |
| 5,758,522 A | * | 6/1998 | York ............................ 70/63 |
| 5,872,513 A | * | 2/1999 | Fitzgibbon et al. ........ 340/5.28 |
| 5,999,095 A | * | 12/1999 | Earl et al. .................... 340/542 |
| 6,218,940 B1 | | 4/2001 | Reje et al. |
| 6,259,352 B1 | | 7/2001 | Yulkowski et al. |
| 6,272,562 B1 | * | 8/2001 | Scott et al. ................... 710/16 |
| 6,326,754 B1 | | 12/2001 | Mullet et al. |
| 6,392,537 B1 | | 5/2002 | Taumi et al. |
| 6,441,719 B1 | * | 8/2002 | Tsui .......................... 340/5.21 |
| 6,486,795 B1 | | 11/2002 | Sobel et al. |
| 2002/0180600 A1 | | 12/2002 | Kirkland et al. |
| 2003/0152253 A1 | * | 8/2003 | Wong .......................... 382/124 |
| 2004/0257199 A1 | * | 12/2004 | Fitzgibbon et al. ........ 340/5.71 |

* cited by examiner

Primary Examiner—Jeffery Hofsass
Assistant Examiner—Scott Au
(74) Attorney, Agent, or Firm—Gardere Wynne Sewell, LLP

(57) ABSTRACT

A console device for controlling a door operator for a motor operated door includes a housing; a transmitter unit, a door operator control circuit, a user accessible door operator switch operable to control a door, an LED driven menu operably connected to the control circuit, an alphanumeric keypad and user input push buttons. The LED driven menu provides visual programming feedback to the user. The LED driven menu may provide feedback such as a home state or ready indicator, a door selector, user code or PIN assignment designators and a programming error indicator.

5 Claims, 5 Drawing Sheets

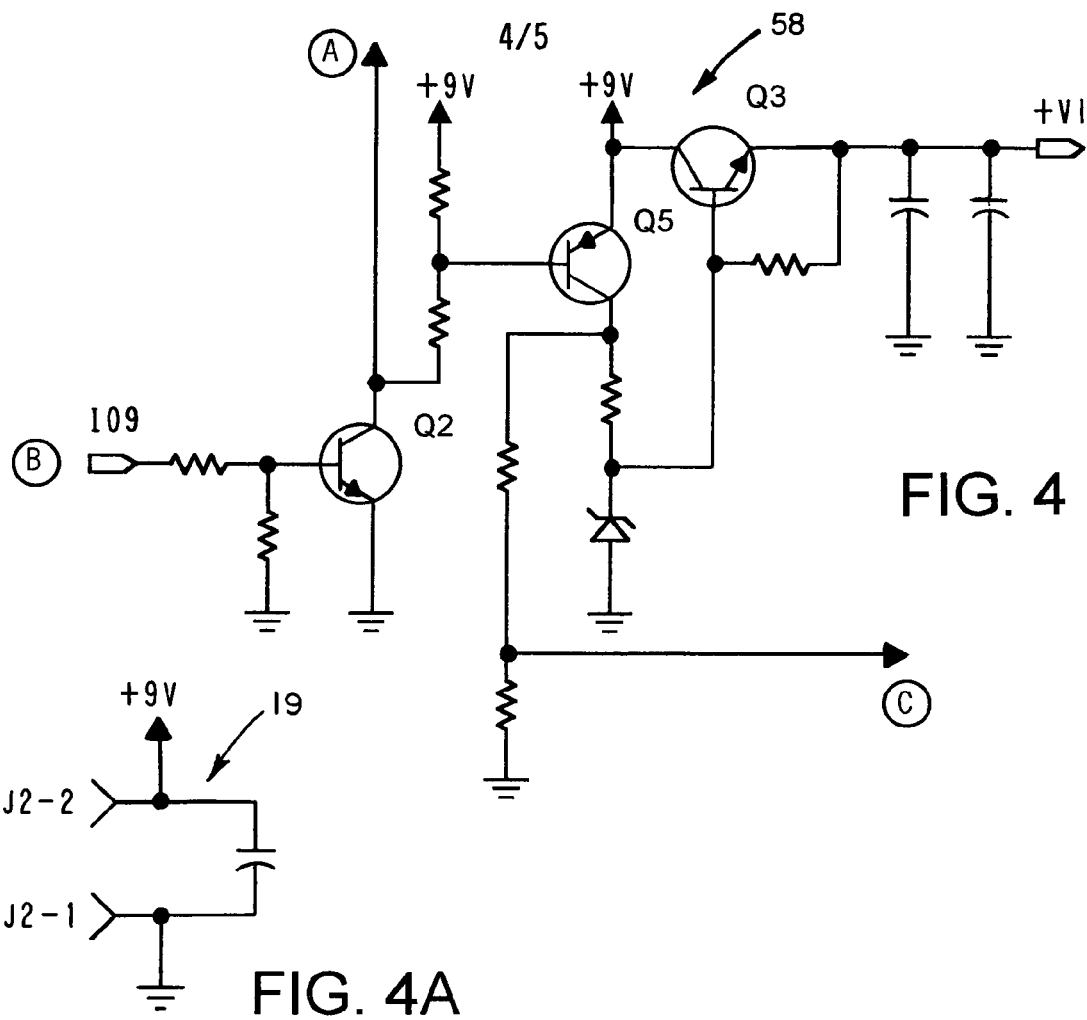
FIG. 4
FIG. 4A
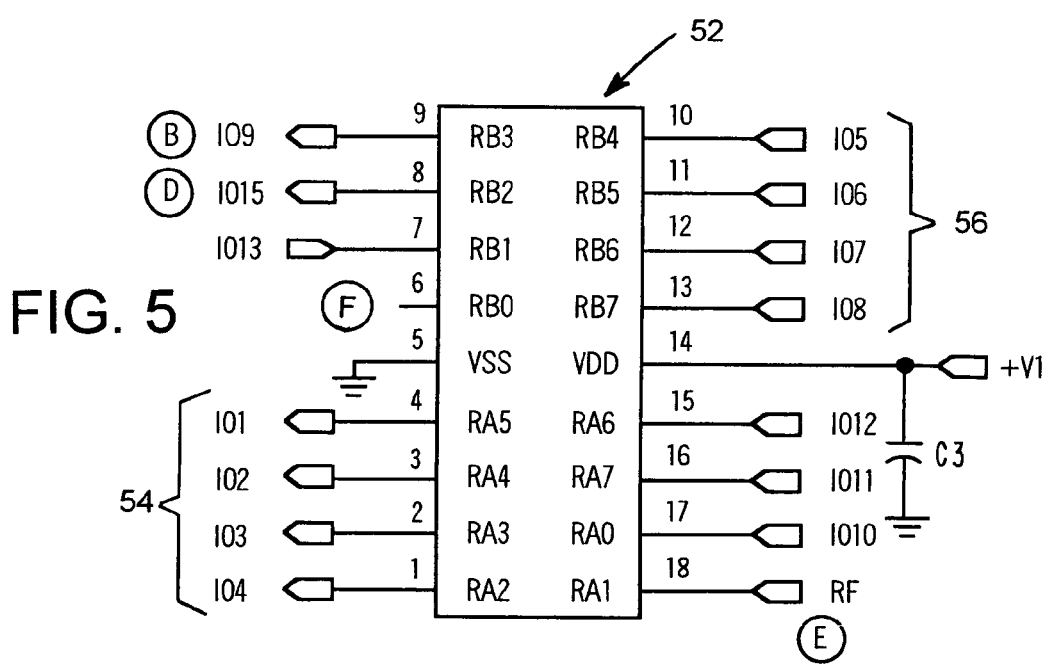
FIG. 5

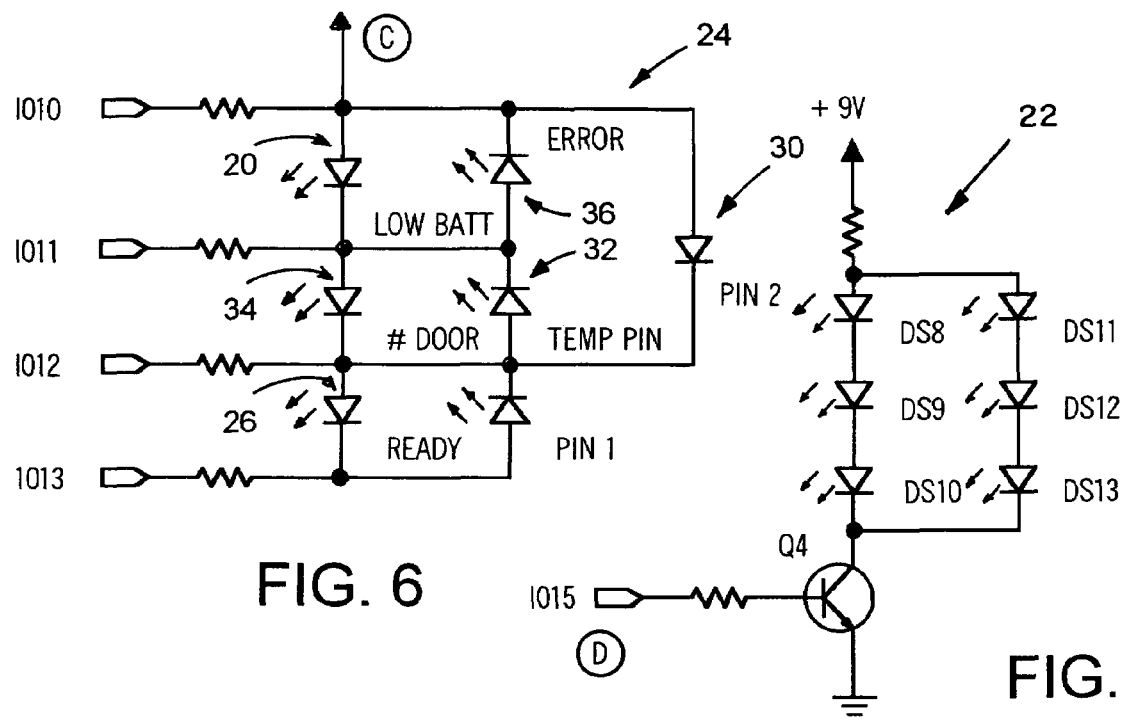
FIG. 6
FIG. 7
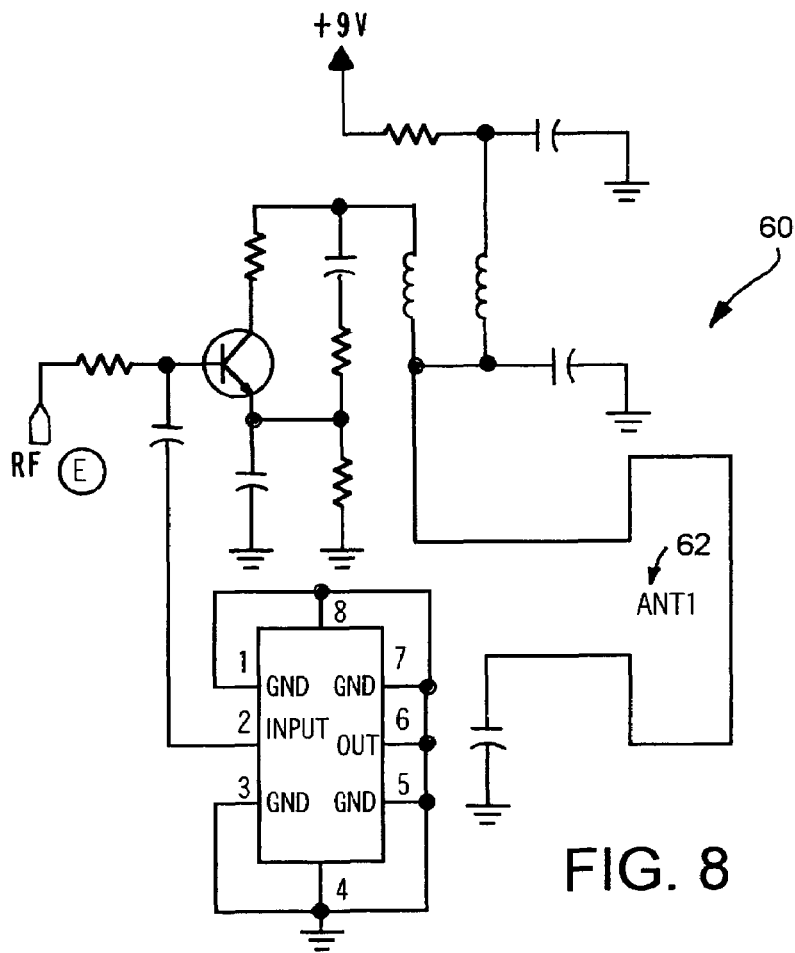
FIG. 8

MENU DRIVEN WALL CONSOLE WITH LED INDICATORS FOR GARAGE DOOR OPERATOR

BACKGROUND

The present invention relates to the general field of garage door or other barrier entry operators, and more particularly, to an external wall mountable, menu driven, console device for such operators.

In the art of garage door operators and the like, it is conventional practice to provide a wall mountable, menu driven, console device to control a door operator from the exterior of a building or a residential dwelling. Console devices known in the art are of various sophistication and user friendliness. Some console devices may be hardwired to the door operator. Other console devices may provide a wireless user interface to the door operator. Still other console devices may allow for a key-like entry system to gain access. Yet other console devices provide access to operation of the garage door after performing a keypad type entry.

It is conventional practice for some console devices to grant access only after entering a user identification or authorization code such as a Personal Identification Number (PIN). Console devices in the art allow a user to program a PIN of their own choosing.

Some conventional console devices provide programming feedback by a blinking light emitting diode (LED). Blinking LEDs fail to convey the nature of an error or confirm an entry while programming. Thus, blinking LEDs in conventional console devices make programming a user determined PIN tedious and difficult.

Because console devices with blinking LEDs offer limited feedback and thus have limited programming capabilities, they also have limited functional capabilities. For example, such console devices lack certain functional capabilities such as the ability to easily program and control more than one door, program more than one unique PIN or to create a separate temporary PIN. Limiting the functional capabilities of a console device limits the usefulness and efficiency of a given console device.

In the art of garage door openers and the like, certain console devices could include liquid crystal displays (or LCDs) to convey console device information to the user. Although these displays may provide the user with some programming feedback, LCDs are costly to manufacture when compared to LEDs, require expensive backlighting, fail to operate in most outdoor environments and do not hold up well in traditional surface mount manufacturing.

Accordingly, improvements in door operator console devices are desired, particularly in menu-driven programmable keyless wall console devices. There is a need for low cost, efficient and easy to use console devices with desirable features. With an easily programmable console device, users will have the ability to, for example, control and operate more than one door, efficiently program more than one PIN number for each door and easily create temporary PINs.

SUMMARY OF THE INVENTION

The present invention provides an improved wall mountable, console device for keyless entry type wall console devices of garage doors, gates and like barriers. The invention provides a wall mountable console device that replaces cumbersome conventional numeric keypad programming with an easy to follow menu driven programming methodology. The invention further provides a menu driven programming methodology where individual visual indicators signal a menu choice. The present invention conveys the nature of an entry and provides a user with meaningful programming feedback.

The present invention provides a number of advantages over prior art console devices including the ability to easily program the console device by using an LED driven menu. The LED driven menu provides instant feedback during the programming session or during normal use. The LED driven menu may include a "READY" LED to provide information on whether the device is in "home" or ready state and an "ERROR" LED to provide a user with feedback on conditions. The LED driven menu may further include items related to PINs and door designator references. For example, the LED driven menu may have a "PIN1" LED, a "PIN2" LED, a "TEMP PIN" LED and a "# DOOR" LED. The present invention also provides an easily ascertainable indication on whether a low battery condition exists by a "LOW BATT" LED.

The present invention provides other advantageous features and increased programming capabilities, while maintaining an easily accessible and simply designed interface. The interface includes, for example, features to aid in the programming and in the operation of the console device by providing user-accessible switches for selecting, entering or canceling an LED menu option or entry. A user can easily program the same PIN for multiple doors using the same console device, program multiple PINs for a single door and create a separate temporary PIN for a single door or more than one door.

The present invention's LED driven menu offers several advantages over conventional console devices with LCD displays. The LED driven menu console device has a lower manufacturing cost and eliminates the use of expensive display backlighting, while maintaining an easy to use programming methodology. Moreover, LEDs can withstand extreme temperature variations, while LCDs tend to be more sensitive to extreme temperature fluctuations. In addition, the present invention's LED driven menu arrangement is more suitable for the use of surface mount technology. Moreover, the LED driven menu provides a low cost yet practical solution for using and programming a console device.

For a more complete understanding of the features and advantages of the present invention, reference is now made to the detailed description of the invention along with the accompanying drawing in which corresponding numerals in the different drawings refer to corresponding parts.

BRIEF DESCRIPTION OF THE SEVERAL VIEWS OF THE DRAWINGS

FIG. 4 is a circuit diagram of the power supply circuit of the LED menu driven keyless wall console device;

FIG. 4A is a circuit diagram of a battery connected to the LED menu driven keyless wall console device;

FIG. 5 is a circuit diagram of the microcontroller of the LED menu driven keyless wall console device;

FIG. 6 is a circuit diagram of the menu LEDs of the LED menu driven keyless wall console device;

FIG. 7 is a circuit diagram of the backlight LEDs of the LED menu driven keyless wall console device;

FIG. 8 is a circuit diagram of the radio frequency (RF) circuitry of the LED menu driven keyless wall console device.

DETAILED DESCRIPTION OF THE INVENTION

Figure 1:
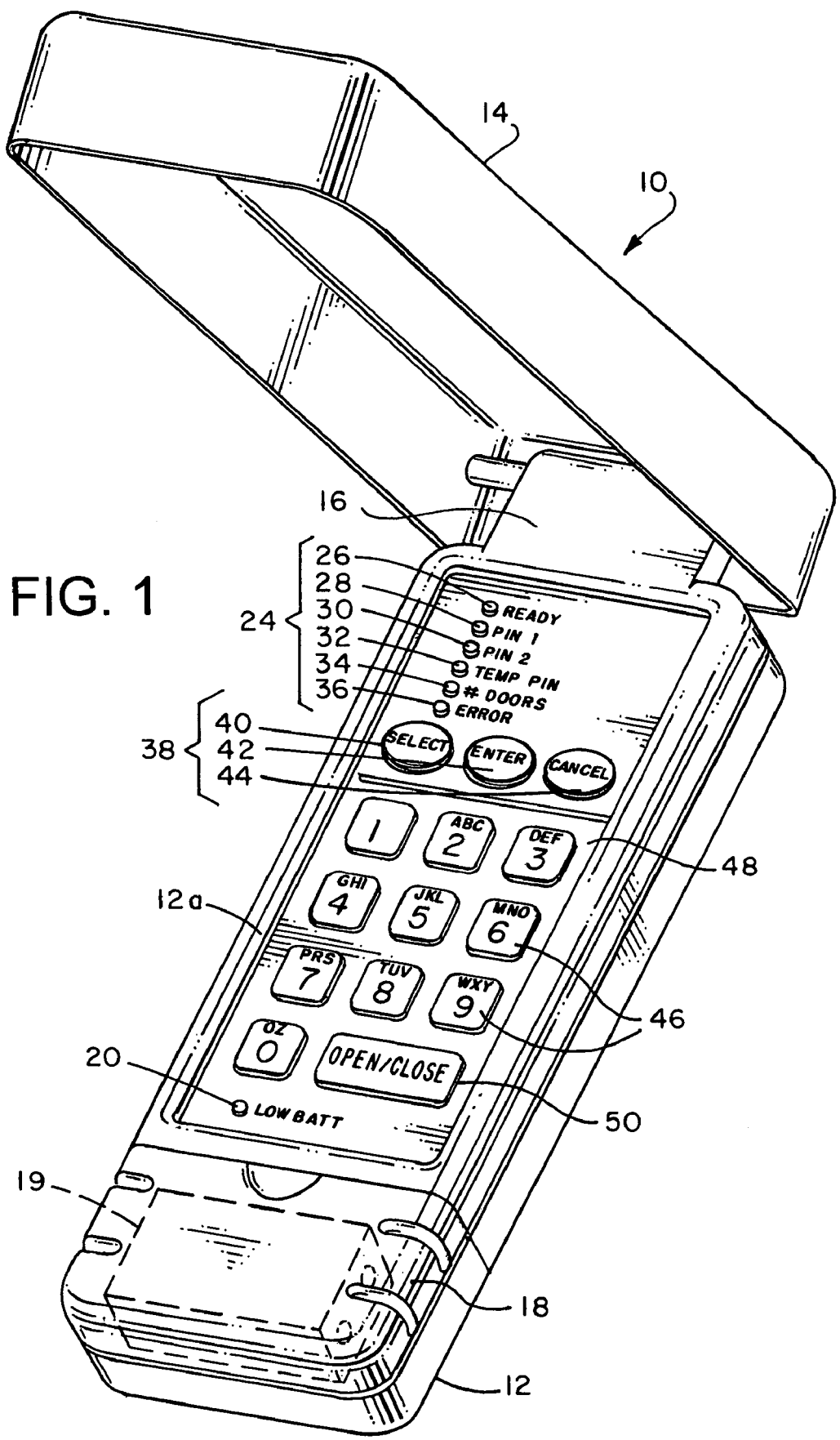
FIG. 1 is a perspective view of a preferred embodiment of an LED menu driven keyless wall console device of the present invention.

In the description that follows, like elements are marked throughout the specification and drawings with the same reference numerals, respectively. The drawing figures are not necessarily to scale and certain elements may be shown in somewhat generalized or schematic form in the interest of clarity and conciseness. Commercially available circuit elements are used throughout.

The present invention comprises an improved menu driven keyless wall console device. FIG. 1 depicts a preferred embodiment of a menu driven keyless wall console device 10. The console device 10 is particularly adapted to mount on an exterior wall of a residential garage, not shown, for use in opening or closing a garage door also not shown. The console device 10 essentially comprises two major structural components, a suitable weather proof housing 12 and a cover 14. FIG. 1 depicts the console device 10 with the cover 14 in the accessible or open position. The cover 14 is preferably hingably attached to an extension 16 of the housing 12 for easy access and for protection from weather elements when in a closed position. When the cover 14 is in an open position, the console device 10 allows a user access to a removable battery compartment cover 18 and thus to a battery 19.

Housing 12 includes a front wall 12a at which several components described herein are disposed, as shown in FIG. 1. For example, the console device 10 may have a low battery LED type visual indicator 20, labeled here as LOW BATT, a visual indicator array or menu 24 and backlight LEDs, not shown in FIG. 1, to provide an illuminated background for the console device 10.

A visual indicator array or menu 24, shown in FIG. 1, in a preferred embodiment, comprises, for example, LED type visual indicators including at least the following menu items: a READY LED 26, a PIN 1 LED 28, a PIN 2 LED 30, a TEMP PIN LED 32, an # DOORS LED 34 and an ERROR LED 36. Each LED menu item is a visual indicator of a selected function, programming object or programming state. For example, an enabled READY LED 26 indicates that the control circuitry of console device 10 is in its home position and is awaiting an entry by a user.

In a preferred embodiment, a user can program the console device 10 with at least two permanent PINs and a temporary PIN. Console device 10 provides an LED menu 24 with options that aid in programming such PINs. For example, by choosing the PIN 1 LED 28 a user may program a first programmable PIN using an alphanumeric keypad 48. A user can, similarly, choose the PIN 2 LED 30 to program a second programmable PIN. A user can further choose the TEMP PIN LED 32 to designate a temporary PIN to accommodate, for example, household guests or service persons that may require temporary access to the household.

The LED menu 24 also provides a menu item to allow the console device 10 the ability to control a plurality of doors. The #DOORS LED 34 menu option allows the user to set the total number of doors that the console device 10 is to control. For example, once the #DOORS LED 34 is selected, the user enters via the keypad 48 either '2', '3' or '4' and then presses the "ENTER" input push button 42. The console device 10 then accepts the entered number and the #DOORS LED 34 goes out and the READY LED 26 comes on, indicating that the entry was accepted without an error. Once the number of doors is set, the user can control multiple doors by first entering the correct PIN, then pressing the "OPEN/CLOSE" push button switch 50, then pressing the specific door to be controlled (i.e. 1, 2, 3 or 4).

The LED menu 24 further provides the ERROR LED 36. The ERROR LED 36 signals a user that the console device 10 detects an error. The ERROR LED 36 may be enabled, for example, subsequent to an incorrect PIN entry or programming entry.

The user also has access to the alphanumeric keypad 48 which may include a set 38 of menu input push button switches 40, 42 and 44, a set of alphanumerically labeled push button switches 46 and an OPEN/CLOSE button 50. The set 38 of input button switches may include a "SELECT" input push button 40, an "ENTER" input push button 42 and a "CANCEL" input push button 44. Each of the alphanumerically labeled push button switches 46 may be designated to correlate with at least one or more numbers and/or letters, as shown in FIG. 1. For example, the alphanumerically labeled push button switch 46 labeled as number "5" also correlates to the letters "J", "K" and "L".

The OPEN/CLOSE button 50 allows the user control over opening and closing a designated door. In a preferred embodiment, the OPEN/CLOSE button 50 toggles a door operator from the open position to the closed position and visa versa. (Note: the actual toggling actually takes place within the opener itself).

Figure 2:
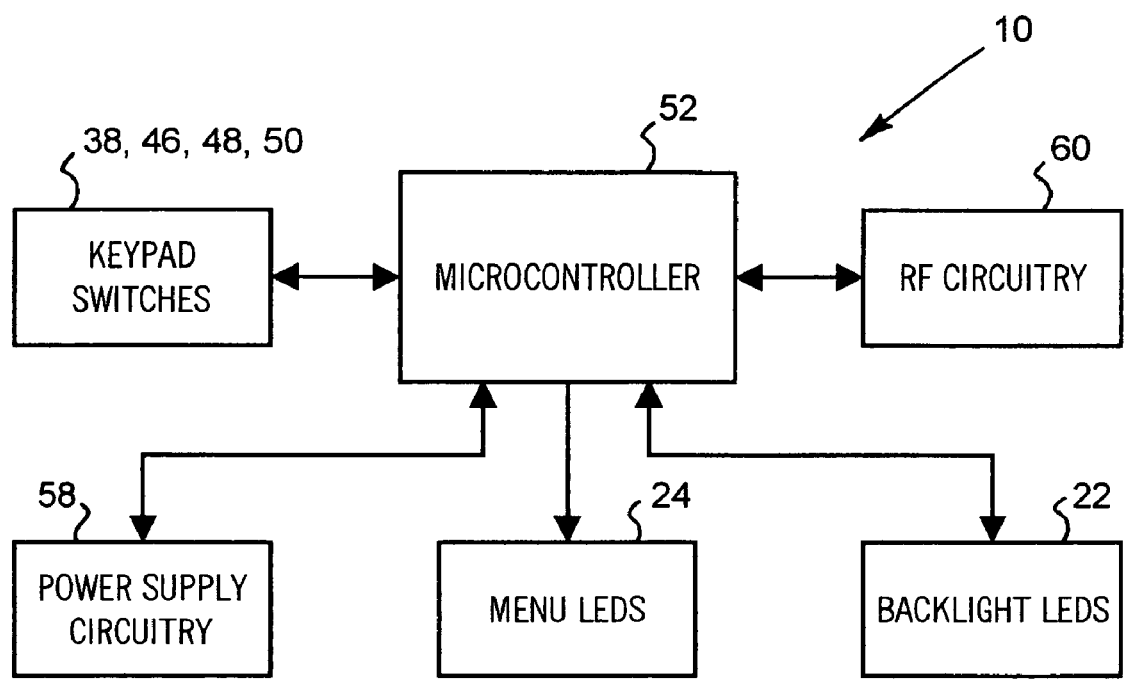
FIG. 2 is a block diagram of the LED menu driven keyless wall console device.

FIG. 2 is a block diagram of the LED menu 24 driven wireless wall console device 10. A microcontroller 52 monitors the logic inputs and outputs of the console device 10. The microcontroller 52 is operably connected to keypad 48, to the menu LEDs 24, to backlight LEDs 22, to a power supply circuit 58 and to an RF transmitter circuit 60. The microcontroller 52 monitors the keypad 48 by sequentially driving outputs 54, see FIG. 3, and reads inputs 56 from the keypad to determine if any keypad switches have been actuated. When a switch 46 on the console device 10 is actuated, the microcontroller 52 may also turn on the backlight LEDs 22. In addition, the microcontroller 52 monitors and measures the voltage of battery 19 and enables the LOW BATT indicator 20 if the battery voltage falls below a predetermined amount.

Figure 3:
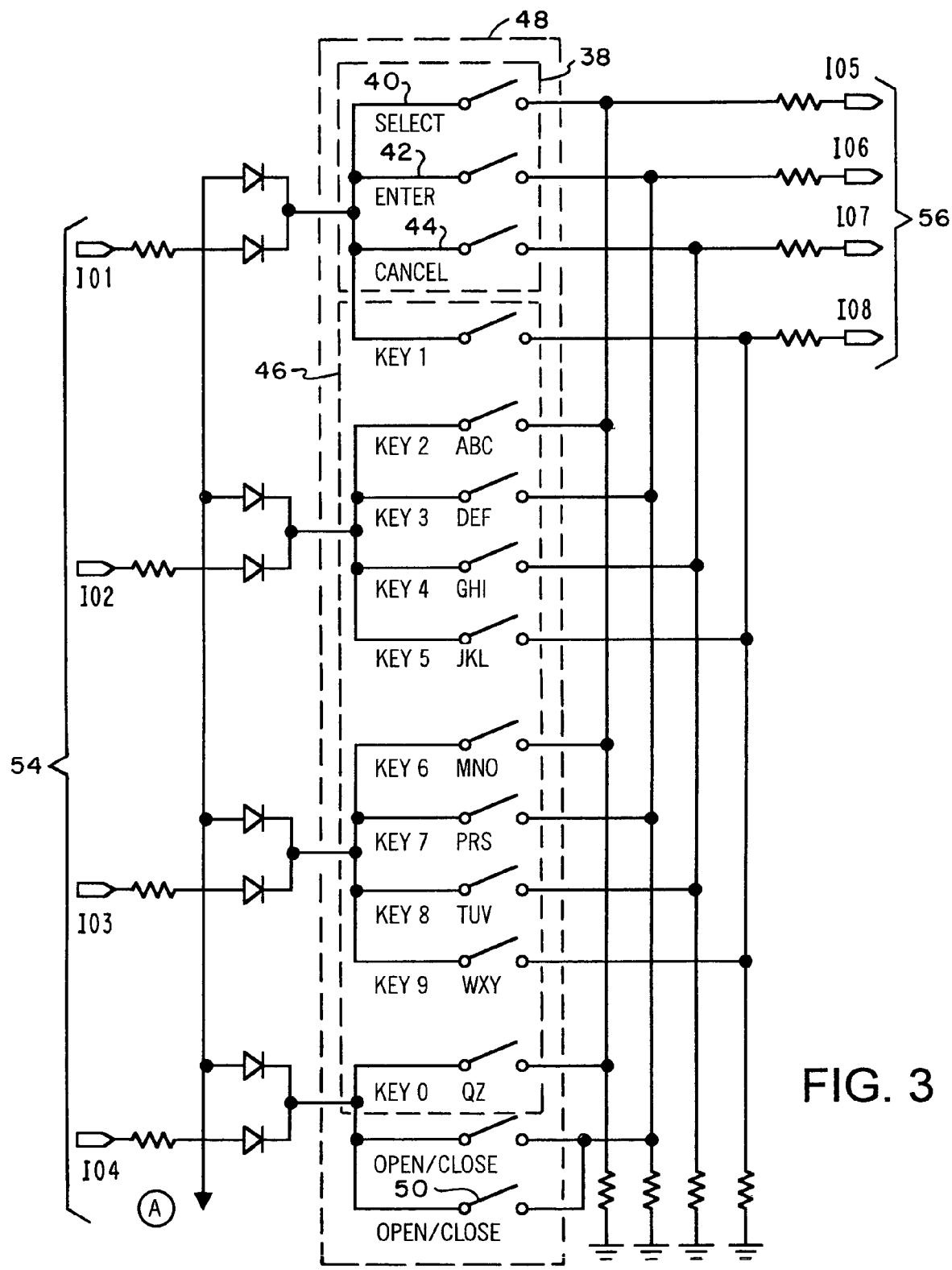
FIG. 3 is a circuit diagram of the keypad switches of the LED menu driven keyless wall console device.

FIG. 3 illustrates a circuit diagram of the keypad 48 of the console device 10. Keypad 48 comprises the set of menu input buttons 38, alphanumerically labeled push button switches 46 and the OPEN/CLOSE button 50. As mentioned above, set 38 includes the SELECT button 40, ENTER button 42 and CANCEL button 44. There are ten alphanumerically labeled push buttons 46, each corresponding to a unique set of alphanumeric characters. The circuit diagrams of FIGS. 3, 4 and 5 through 8 are interconnected at the encircled letters "A" through "E" and as otherwise described herein.

When idle, the microcontroller 52 is not powered because the power supply circuitry 58 is off. When any keypad switch 48 is pressed, transistor Q2 is turned on and the power supply circuitry 58 is turned on thus applying power to the microcontroller 52. The microcontroller 52 then outputs a high voltage level on I/O line 109 and biases transistor Q2 on, thus latching 'on' the power supply circuitry 58. The microcontroller 52 sequentially pulses I/O lines IO1 thru IO4 to the keypad input 54 and reads the keypad output 56 to determine which switch was pressed.

To enable programming of the console device 10, a user preferably enters a PIN, by actuating the corresponding alphanumerically labeled switches 46. After the user has completed entering their PIN, the user then depresses the ENTER button 42. If a correct PIN has been entered, the console device 10 will light the LED menu item READY LED 26. Thus, the console device 10 allows secured access only to those knowing a particular pre-programmed PIN. If a user enters an incorrect PIN, the console device 10 will energize the ERROR LED 36. The console device 10 may deny access to a user for a predetermined time period if plural incorrect PINs have been entered consecutively.

The LED menu 24, the set of menu input buttons 38 and the alphanumerically labeled buttons 46, assist the user to program the PINs. Once the user enters the correct PIN1 followed by pressing the ENTER button 42, the console device 10 will indicate its programming mode 'home' position by a lit READY LED 26. The user may sequentially select a menu function from the LED menu 24 by pressing the SELECT button 40 until the function the user desires to program or choose lights up. The user then makes the appropriate keypad entry and then presses the ENTER button 42. The console device 10 then will light the READY LED 26 indicating that a correct entry was made and that the console device is now ready for the user to select an additional function, if so desired. If no further input is provided by the user, the console device 10 will turn off after a predetermined amount of time.

When idle, the microcontroller 52 is not powered because the power supply circuitry 58 is off. The user would approach the console device 10 and place it in the open position, as illustrated in FIG. 1. The user then would press a desired button on the wall console device 10. This action would turn on the power supply circuitry 58 and supply power to the microcontroller 52. The microcontroller 52, in turn, enables the backlight LEDs 22. The user may enter PIN1 followed by pressing the ENTER button 42, thus placing the console device 10 in the programming mode. The microcontroller 52 would then light the READY LED 26 indicating that the console device 10 is waiting for a program function to be selected. If the user desired to change PIN 1, the user would sequentially actuate the SELECT button 40 until PIN1 LED 28 is selected. Then, while PIN1 LED 28 is selected, the user can enter a new PIN, to be designated as 'PIN1'. After entering the new PIN1, the user would then actuate the ENTER button 42. The console device 10 recognizes this new entry and indicates its programming home position by lighting the READY LED 26. Thus, a first PIN1 has successfully been programmed into the console device 10 by using the LED driven menu 24. If, however, the console device 10 recognizes that the PIN does not meet some predetermined criteria (for example a certain minimal or maximum number of characters), then the LED menu 24 may enable the ERROR LED 36. The user would, in that case, repeat the programming process. If at any time during programming, a predetermined amount of time passes without any keypad activity by the user, the microcontroller 52 would turn off the power supply circuitry 58, thus conserving battery 19 energy.

A similar programming method may be followed to program a second PIN by selecting PIN 2 LED 30. A user may also decide to program a separate temporary PIN to grant temporary access to, for example, a service worker or houseguest, by selecting the TEMP PIN LED 32. Although the console device 10 shown here provides for two PIN numbers, it is believed to understood that those skilled in the art can easily modify console device 10 to allow more than two PINs.

Similarly, the LED menu 24 visually assists a user to program other desirable features. For example, a user may program a single PIN for multiple doors controlled by the same console device 10 by selecting the # DOORS LED 34 after entering the correct PIN followed by pressing the ENTER button 42. Suppose for example, the user has a console device 10 controlling three doors. While the # DOORS LED 34 is lit, the user would enter the number '3' from the keypad 48 followed by pressing the ENTER button 42. The console device 10 would no be programmed to control three separate door openers. Now if the user desires to control one of the three doors, for example, the third door, they would wait for the console device 10 to turn off, enter the correct PIN, then press the OPEN/CLOSE button 50 and then press the alphanumeric keypad entry for '3'. After a user has access to a door, a user can, for example, decide to open or close the door by pressing any keypad pushbutton switch.

FIG. 4 depicts a preferred embodiment of the power supply circuit 58, comprising a simple series pass regulator, of the console device 10. The microcontroller 52 manages the power supply 58 as also seen in FIG. 5. For example, when one of the menu input buttons of set 38 or alphanumerically labeled push button switches 46 is actuated, transistor Q5 is turned on, thus turning the power supply section 52 "on". The microcontroller 52 outputs a logical '1' on Input/Output (I/O) line 9, which enables transistor Q2. Q2 maintains a ground path for transistor Q5 and thus the microcontroller 52 enables the power supply 58 regardless of which keypad switch or button 46 is actuated. After a predetermined amount of time of no keypad activity, the microcontroller 52 will set I/O line 9 to a logic '0' and turn off the power supply section 58. Thus, the microcontroller 52 and the power supply section 58 work in conjunction to maintain an energy efficient system for the console device 10.

FIG. 4 further depicts connection "A" between the collector of transistor Q2 of the power supply section 58, depicted in FIG. 4, and the circuit diagram of the keypad 48, depicted in FIG. 3. Connection "B" connects pin 9 of the microcontroller 52, depicted in FIG. 5, and the power supply section 58, depicted in FIG. 4. Connection "C" connects the power supply section 58 to the LED menu 24 and 'low battery' indicator LED 20 of the console device 10, depicted in FIG. 6. A +V1 is output from the emitter of transistor Q3 and connects the power supply section 58 to pin number 14 of the microcontroller 52, see FIG. 5.

FIG. 4A depicts a preferred battery connection circuit supply of console device 10. A nine-volt battery 19, connects to a typical circuit board (not shown) and secured to the circuit board by way of connectors J2-1 and J2-2. Battery 19 supplies positive nine volts (+9V) to various locations on the circuits depicted, for example, in FIGS. 3, 4, 7 and 8.

FIG. 5 depicts a preferred embodiment of the microcontroller 52 used in console device 10. The microcontroller 52 is a preferably an 18-pin semiconductor device which controls and manages the functions of the console device 10. The microcontroller 52 may be of a type commercially available, such as an 8-bit PICmicro® 16 series microcontroller, available from Microchip Technology, Chandler, Ariz.

The microcontroller 52 is responsible for monitoring the set 38 of menu input buttons 38 and alphanumerically labeled push button switches 46 to determine which have been actuated. Specifically, the microcontroller 52 sequentially drives I/O lines 1, 2, 3 and 4 and reads I/O lines 5, 6, 7 and 8 to determine which switch 46 was actuated. Pin numbers 1–4 of the microcontroller 52 are connected to I/O lines 4, 3, 2 and 1, while pin numbers 10–13 tie into I/O lines 5, 6, 7 and 8, see FIG. 3. Pin 5 of the microcontroller 52 is tied to ground while Pin 6 is tied to the audio feedback circuit 64, as illustrated by connection "F." Pins 7 and 15–17 are multiplexed to the LED menu 24 and the LOW BATT indicator 20, as depicted in FIG. 6. Pin 8 is tied to the backlight LEDs 22, as illustrated by connection "D". Pin 14 is tied to a +V1.

The microcontroller 52 manages the power supply section 58, as seen in FIG. 5. Pin 9 is tied to the power supply section 58, as illustrated by connection "B". The RF section 60 is enabled and modulated by algorithms programmed into the microcontroller 52. Pin 18 is tied to the RF section 32.

FIG. 6 depicts a preferred embodiment of the LED menu 24 and 'low battery' indicator LED 20 of the console device 10. Six of the seven LEDs depicted correspond to the LED menu 24: READY LED 26, PIN 1 LED 28, PIN 2 LED 30, TEMP PIN LED 32, #DOORS LED 34 and ERROR LED 36. Each individual LED in the LED menu 24 serves as programming and operational menu choices. The seventh LED corresponds to the LOW BATT indicator 20.

The LED menu 24 is preferably multiplexed such that the microcontroller 52 controls the seven LEDs in the LED menu 24 with only four input/output or I/O lines. For example, if the microcontroller 52 finds that the console device 10 is ready for user input, it will forward bias the READY LED 26 by essentially disabling I/O lines 10 & 11, setting I/O line 12 high and setting I/O line 13 low.

The LED menu 24 preferably aids a user to program a multitude of functions and generally utilize console device 10. The console device 10 is ready for programming when the READY LED 26 is enabled. Using the SELECT input button 40 a user can sequentially select a desired LED menu 24 function to use or program the console device 10, see FIG. 3. The READY LED 26 would then turn off and the selected LED menu 24 function would be enabled. The user accordingly inputs the desired entries and actuates the ENTER input button 42 when the entry is complete. If the console device 10 does not enable the ERROR LED 36, the user has successfully completed the previously selected menu 24 function and console device 10 will return to the home state, enabling the READY LED 26. If at some point during the programming process, a user decides that an incorrect menu 24 function is enabled, the user may actuate the CANCEL push button 44 and return to home state, again enabling the READY LED 26.

FIG. 6 also depicts a preferred low battery indicator LED 20. As discussed earlier, the low battery indicator LED 20 is enabled when the microcontroller 52 detects that the battery 19 voltage falls below a predetermined voltage.

FIG. 7 depicts a preferred embodiment for backlight LEDs 22 of the LED menu driven keyless wall console device 10. The backlight LEDs 22 illuminate the keypad 48 such that it is visible in dark ambient conditions. The backlight LEDs 22 are preferably placed as a set of three LEDs in parallel with another set of three LEDs. The backlight LEDs 22 are triggered on when either a menu input button 38 or alphanumerically labeled push button switches 46 of the console device 10 is actuated. When activity is detected, the microcontroller 52 powers transistor Q4, and thus turns on the backlight LEDs 22. Likewise, after a predetermined duration of time without any activity, the microcontroller 52 disables the backlight LEDs 22 by turning off transistor Q4, thus conserving energy. The backlight LED 22 circuit ties into pin number 8 of the preferred microcontroller 52, as seen by connection "D".

Although the console device 10 may be configured to communicate with a door operator by hardwiring, FIG. 8 illustrates a diagram of an RF circuit or section 60 of the console device 10. The RF section 60 is enabled and modulated by algorithms programmed into the microcontroller 52. The RF section 60 has an antenna 62 enabling it to transmit appropriate commands to the door operator. The RF section 60 is tied, by way of connection "E", to pin number 18 of the microcontroller 52. A typical mode of operation may be that which is described in U.S. Pat. No. 6,049,289 to Dennis Waggamon et al., and which is incorporated herein by reference. It is should be understood by one skilled in the art, that the console device 10 need not be wireless, but alternatively could be hardwired to a desired garage door or the like.

Figure 9:
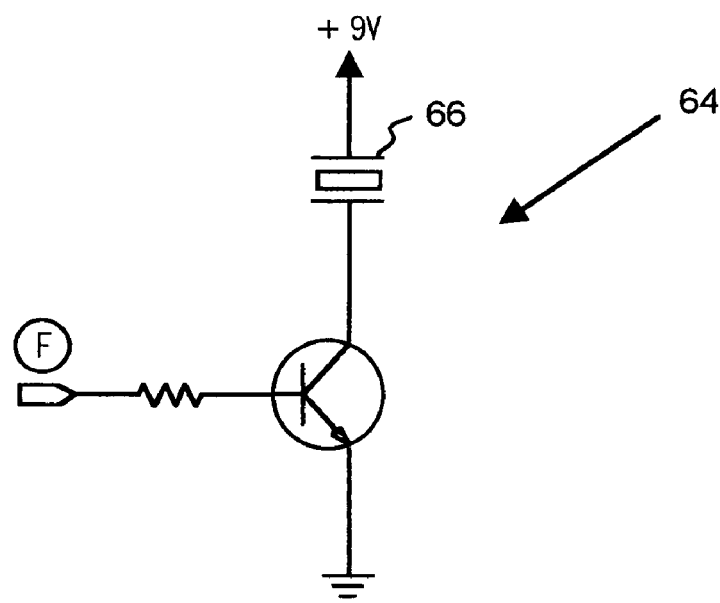
FIG. 9 is a circuit diagram of an audio feedback circuit.

FIG. 9 depicts a preferred embodiment for an audio feedback circuit 64. Microcontroller 52 modulates a piezo electric transducer 66 to produce various audio tones. Console device 10 may incorporate audio signals, periodically, corresponding to ERROR LED 36, and to alert the user of an error both visually and audibly through the programming process. Console device 10 may also incorporate audio signals to alert the user of other user feedback functions such as low battery 19 conditions or simply positive feedback for a keystroke entry.

Although a preferred embodiment of a menu driven wall console device 10 and various embodiments of the present invention are discussed in detail herein, it will be appreciated that the present invention provides many applicable inventive concepts that can be embodied in a wide variety of specific contexts. For example, while the description has principally referenced a operator for a garage door, it is to be understood that the console of the present invention may also be utilized for gate and other barrier operators. The specific embodiments discussed herein are merely illustrative of specific ways to make and use the invention, and do not delimit the scope of the invention. Those skilled in the art will recognize that various substitutions and modifications may be made to the invention without departing from the scope and spirit of the appended claims.

What is claimed is:

1. A console device for controlling a door operator comprising:

a door operator control circuit;

a power supply circuit for supplying electrical power from a power source to the door operator control circuit;

a keypad including plural alphanumeric switches and a door operator control switch operably connected to said door operator control circuit;

plural command switches for providing input signals to the door operator control circuit including a command switch for selecting a menu item, a command switch for entering a menu item to said door operator control circuit and a command switch for cancelling a selected menu item; and a visual indicator menu including separate plural visual indicators for assisting a user of the console device to operate the console device to control at least one door operator, comprising:

a visual indicator for providing a signal indicating that the console device is ready for the user to input a first user identification code;

a visual indicator for providing a signal indicating that the console device is ready for the user to input a further user identification code;

a visual indicator for providing a signal indicating that the console device is ready for the user to input a temporary user identification code;

a visual indicator for providing an error signal; and a visual indicator for selecting a door to be controlled from a plurality of doors controllable by the console device.

2. The console device set forth in claim 1, wherein the plural visual indicators comprise light emitting diodes (LEDs).

3. The console device set forth in claim 1, including a wireless signal transmitter connected to said door operator control circuit.

4. The console device set forth in claim 1, including an audio signal generating means to indicate at least one of: an error in operation of the door operator control circuit, an insufficient supply of electrical power, an input on the keypad, an input on one of the plural command switches, and an enabled visual indicator on the visual indicator menu.

5. A console device for controlling a door operator comprising:

a door operator control circuit;

a power supply circuit for supplying electrical power from a power source to the door operator control circuit;

a keypad including plural alphanumeric switches and a door operator control switch operably connected to said door operator control circuit;

plural command switches for providing input signals to said door operator control circuit including a command switch for selecting a menu item, a command switch for entering a menu item to said door operator control circuit and a command switch for canceling a selected item; and a visual indicator menu indicating separate plural visual indicators for assisting a user of the console device to operate the console device to control at least one door operator, comprising:

a visual indicator for providing a signal indicating that the console device is ready for the user to input a user identification code; and a visual indicator for providing a signal indicating that the console device is ready for the user to input a temporary user identification code.

* * * * *